United States Patent [19]
Fujisawa et al.

[11] 3,835,196
[45] Sept. 10, 1974

[54] PROCESS FOR PREPARING THIOBISPHENOLS

[75] Inventors: Tamotsu Fujisawa; Takakazu Kojima; Kazumi Hata, all of Tokyo, Japan

[73] Assignee: Sagami Chemical Research Center, Tokyo, Japan

[22] Filed: Nov. 7, 1972

[21] Appl. No.: 304,470

Related U.S. Application Data

[63] Continuation of Ser. No. 85,767, Oct. 30, 1970, abandoned.

[30] Foreign Application Priority Data
Nov. 12, 1969  Japan............................... 44-90073

[52] U.S. Cl............................. 260/608, 260/609 F
[51] Int. Cl.................... C07c 149/36, C07c 149/38
[58] Field of Search ......................... 260/608, 609 F

[56] References Cited
UNITED STATES PATENTS
2,207,719   7/1940   Cohen................................. 260/608

OTHER PUBLICATIONS
Lefevre et al., Compt. Rend. 198 1432–1434 & 1791–1793 (1934).

*Primary Examiner*—Lewis Gotts
*Assistant Examiner*—D. R. Phillips
*Attorney, Agent, or Firm*—Flynn & Frishauf

[57] ABSTRACT

A new process for the production of 4,4'-mono- and/or poly-thiobis(2,6-dialkylphenol) is described. 2,6-Dialkylphenol reacts with sulfur powder in the presence of an alkali hydroxide or alkali metal in a solvent under heating. The process yields 4,4'-mono- and/or poly-thiobis(2,6-dialkylphenol) economically and in a high yield. These compounds are useful as an antioxidants.

5 Claims, No Drawings

PROCESS FOR PREPARING THIOBISPHENOLS

This is a continuation of application Ser. No. 85,767 filed Oct. 30, 1970, now abandoned.

BACKGROUND OF THE INVENTION

This invention relates to a process for preparing 4,4'-mono- and/or poly-thiobis(2,6-dialkylphenols) having the following formula:

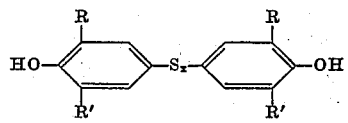

wherein R and R' represent respectively aliphatic hydrocarbon radicals, and $x$ is a positive integer from one to four. A method using sulfur chlorides to prepare the compounds of this series has been known heretofore. However, this prior method is not satisfactory from an industrial and economic viewpoint, because the sulfur chlorides are unstable and further, hydrochloric acid is formed as one of products and said hydrochloric acid may corrode the reaction vessel as a result.

SUMMARY OF THE INVENTION

The present invention relates to a process for preparing 4,4'-mono- and/or poly-thiobis(2,6-dialkylphenol) characterized by reacting a 2,6-dialkylphenol with sulfur powder. It is advantageous to use sulfur powder directly as a starting material for sulfidation of aromatic compounds, although sulfur chlorides can be produced from sulfur powder and chlorine. The process of this invention relates to a process for preparing 4,4'-mono- and/or poly-thiobis(2,6-dialkylphenol) directly from a 2,6-dialkylphenol characterized by reacting 2,6-dialkylphenol with sulfur powder in a solvent under basic condition and heating. The 2,6-dialkylphenols favored for the starting material in this invention involves hindered phenols which possess alkyl groups in 2— and 6— positions, i.e. in the positions ortho to the OH group. It is important that the process of the present invention be carried out in basic condition, and to create this basic condition the use of alkali metal or alkali hydroxide is preferred. These basic materials may be used usually in the amounts of equivalent mole or more to a mole of hindered phenol.

As regards the solvent which is to be used in the present process, any solvent which will not react with the basic materials or the final product may be employed. The preferred alcohols for use as solvent include methanol, ethanol, propanol, glycol and solvents such as pyridine, dimethyl formamide and dimethyl acetoamide. Also, a mixture of these solvents and water in any proportions may be used in the present invention.

In practicing the present invention, an alkali hydroxide or an alkali metal and sulfur powder is added to a hindered phenol in a solvent of the type mentioned, and is heated; the heating time is generally 0.5 – 50 hours. The reaction product is obtained by a conventional method from the reaction mixture after completion of the reaction.

DESCRIPTION OF PREFERRED EMBODIMENTS

The following examples are not limitative, but merely illustrate this invention. In the examples all parts are by weight unless otherwise specified.

EXAMPLE 1.

A mixture of 4.1 parts of 2,6-di-t-butylphenol and 1.9 parts of sulfur powder (mole ratio 1:3) was heated under refluxing for 0.5 hour in 95 percent ethanol solution containing 1.7 parts of potassium hydroxide (1.5 equivalents of KOH for 2,6-di-t-butylphenol). The mixture was neutralized by hydrochloric acid, and extracted with benzene. After evaporation of benzene, the residue was separated by column chromatography, and the mixture of 4,4'-mono- and poly-thiobis(2,6—di-t-butylphenol) was obtained. NMR measurement showed the following yield of each of the following sulfides in the mixture:

4,4'-thiobis(2,6-di-t-butylphenol) 65 percent
4,4'-dithiobis(2,6-di-t-butylphenol) 21 percent
4,4'-trithiobis(2,6-di-t-butylphenol) 5 percent Each sulfide can be isolated by recrystallization from the mixture of ethanol solution.

The following table shows the yields effected by the variation of molar ratio of sulfur powder and potassium hydroxide.

| Molar ratio | | | Yield (percent) | | | |
|---|---|---|---|---|---|---|
| t-Bu-phenol-t-Bu-OH | $S_8$, | KOH, | HO-(t-Bu)-(t-Bu)-$S_x$-(t-Bu)-(t-Bu)-OH | | | |
| mole | g.-atom | mole | X=1 | X=2 | X=3 | X=4 |
| 1 | 10 | 1.5 | 24 | 10 | 16 | 34 |
| 1 | 5 | 1.5 | 33 | 14 | 17 | 30 |
| 1 | 4 | 1.5 | 63 | 20 | 9 | ---- |
| 1 | 3 | 1.5 | 65 | 21 | 5 | 2 |
| 1 | 2 | 1.5 | 50 | 17 | 2 | 2 |
| 1 | 1 | 1.5 | 24 | 4 | 2 | 2 |
| 1 | 0.5 | 1.5 | 3 | 2 | ---- | ---- |
| 1 | 3 | 0.75 | 31 | 4 | 6 | 13 |
| 1 | 3 | 2.25 | 62 | 19 | 6 | 6 |

EXAMPLE 2.

The procedure of Example 1 was repeated except that propanol was used as solvent. 4,4'-Thiobis(di-t-butylphenol) was obtained, the yield being 53 percent.

EXAMPLE 3.

The procedure of Example 1 was repeated except that 2.5 parts of 2,6-dimethylphenol were used instead of 2,6-di-t-butylphenol. By this procedure, 4,4′—thiobis(2,6-dimethylphenol) (M.P. 123° – 4°C) was isolated, the yield being 27 percent.

EXAMPLE 4.

The procedure of Example 1 was repeated except that 3.5 parts of 2,6-di-isopropylphenol were used instead of 2,6-di-t-butylphenol. By this procedure, 4,4′-mono- and poly-thiobis (2,6-diisopropylphenol) was obtained, the yield being 50 percent.

EXAMPLE 5.

The procedure of Example 1 was repeated except that 3.3 parts of 2 methyl-6-t-butylphenol were used instead of 2,6-di-t-butylphenol. By this procedure, 4,4′-thiobis(2-methyl-6-butylphenol) (M.P. 123° – 4°C) was isolated, the yield being 25 percent).

We claim:

1. A process for preparing a 4,4′-mono- or poly-thiobis(2,6-tert-butylphenol) having the general formula:

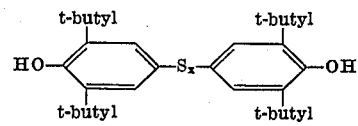

wherein $x$ is a positive integer from one to four, characterized by refluxing 2,6-di-tert-butylphenol with sulfur powder with heat in the presence of an alkali metal hydroxide in a solvent selected from the group consisting of methanol, ethanol and propanol and mixtures thereof with water.

2. The process of claim 1, wherein the hydroxide is potassium hydroxide.

3. The process of claim 1, wherein the solvent is methanol.

4. The process of claim 1, wherein the solvent is ethanol.

5. The process of claim 1, wherein the solvent is propanol.

* * * * *